(12) United States Patent
Lim et al.

(10) Patent No.: US 9,641,749 B2
(45) Date of Patent: *May 2, 2017

(54) ONSCREEN FUNCTION EXECUTION METHOD FOR MOBILE TERMINAL HAVING A TOUCHSCREEN

(71) Applicant: Samsung Electronics Co., Ltd., Suwon-si, Gyeonggi-do (KR)

(72) Inventors: Wan Soo Lim, Seongnam-si (KR); Hyo Young Kim, Seongnam-si (KR); Dok Shin Lim, Seoul (KR); Kyoung Ae Lim, Seoul (KR); Min Suk Kim, Seoul (KR); Young Sun Shin, Seoul (KR); Hee Kyung Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,899

(22) Filed: Jun. 27, 2016

(65) Prior Publication Data

US 2016/0309078 A1   Oct. 20, 2016

Related U.S. Application Data

(63) Continuation of application No. 14/613,627, filed on Feb. 4, 2015, now Pat. No. 9,395,913, which is a (Continued)

(30) Foreign Application Priority Data

Feb. 8, 2007   (KR) .................. 10-2007-0013448

(51) Int. Cl.
  *G06F 3/045*   (2006.01)
  *H04N 5/232*   (2006.01)
  (Continued)

(52) U.S. Cl.
  CPC ......... *H04N 5/23216* (2013.01); *G06F 3/041* (2013.01); *G06F 3/044* (2013.01);
  (Continued)

(58) Field of Classification Search
  CPC .. G06F 3/0488; G06F 3/0481; G06F 3/04817; G06F 3/0482; G06F 3/0484;
  (Continued)

(56) References Cited

U.S. PATENT DOCUMENTS 6,292,857 B1   9/2001 Sidoroff et al.
7,365,787 B2   4/2008 Nobels
(Continued)

FOREIGN PATENT DOCUMENTS

JP    7-230352 A      8/1995
JP    2004-355106 A   12/2004
KR    10-2006-0085850 A   7/2006

*Primary Examiner* — Vijay Shankar
(74) *Attorney, Agent, or Firm* — Jefferson IP Law, LLP

(57) ABSTRACT

An onscreen function execution method for a mobile terminal having a touchscreen is provided. The method allows for executing functions of an activated application by a tap on a specific area of the touchscreen. An onscreen function execution method of the present invention includes mapping active regions of the touchscreen to functions of at least one application, displaying an application screen in response to an application activation command and executing, if a tap is detected on one of the active regions, a function mapped to the application activation command. The active regions may include a function execution display region and the applications may comprise a camera application, a music player application, an idle mode screen application and the like. The method allows a user to execute functions of an activated application by tap on the touchscreen.

20 Claims, 5 Drawing Sheets

Related U.S. Application Data continuation of application No. 12/014,056, filed on Jan. 14, 2008, now Pat. No. 9,041,681.

(51) Int. Cl.
- *G06F 3/041* (2006.01)
- *G06F 3/044* (2006.01)
- *G06F 3/0488* (2013.01)
- *G06F 3/0481* (2013.01)
- *G06F 3/0482* (2013.01)
- *G06F 3/0484* (2013.01)

(52) U.S. Cl.
 CPC .......... *G06F 3/0482* (2013.01); *G06F 3/0488* (2013.01); *G06F 3/04817* (2013.01); *G06F 3/04847* (2013.01); *G06F 3/04883* (2013.01); *H04N 5/23212* (2013.01); *H04N 5/23222* (2013.01); *H04N 5/23293* (2013.01)

(58) Field of Classification Search
 CPC ...... G06F 3/04847; G06F 3/041; G06F 3/044; G06F 3/04883
 USPC ................... 345/173–178; 178/18.01–18.07, 178/20.01–20.04
 See application file for complete search history.

(56) References Cited

U.S. PATENT DOCUMENTS

| | | | |
|---|---|---|---|
| 7,694,231 B2 | 4/2010 | Kocienda et al. | |
| 7,940,250 B2 | 5/2011 | Forstall | |
| 8,356,254 B2 | 1/2013 | Dennard et al. | |
| 8,416,205 B2 | 4/2013 | Rapp et al. | |
| 9,041,681 B2 | 5/2015 | Lim et al. | |
| 9,395,913 B2 * | 7/2016 | Lim | G06F 3/0488 |
| 2002/0080257 A1 | 6/2002 | Blank | |
| 2004/0263487 A1 | 12/2004 | Mayoraz et al. | |
| 2005/0041953 A1 | 2/2005 | Lo | |
| 2005/0052406 A1 | 3/2005 | Stephanick et al. | |
| 2005/0286715 A1 | 12/2005 | Cheah et al. | |
| 2006/0106539 A1 | 5/2006 | Choate et al. | |
| 2007/0018069 A1 | 1/2007 | Higashino | |
| 2007/0040810 A1 | 2/2007 | Dowe et al. | |
| 2007/0152978 A1 | 7/2007 | Kocienda et al. | |
| 2007/0152980 A1 | 7/2007 | Kocienda et al. | |
| 2007/0160359 A1 | 7/2007 | Imamura | |
| 2008/0055273 A1 | 3/2008 | Forstall | |
| 2008/0143975 A1 | 6/2008 | Dennard et al. | |
| 2009/0033786 A1 | 2/2009 | Finkelstein et al. | |
| 2009/0201264 A1 | 8/2009 | Hsu et al. | |
| 2010/0082445 A1 | 4/2010 | Hodge et al. | |
| 2011/0074698 A1 | 3/2011 | Rapp et al. | |
| 2013/0002539 A1 | 1/2013 | Dennard et al. | |

* cited by examiner

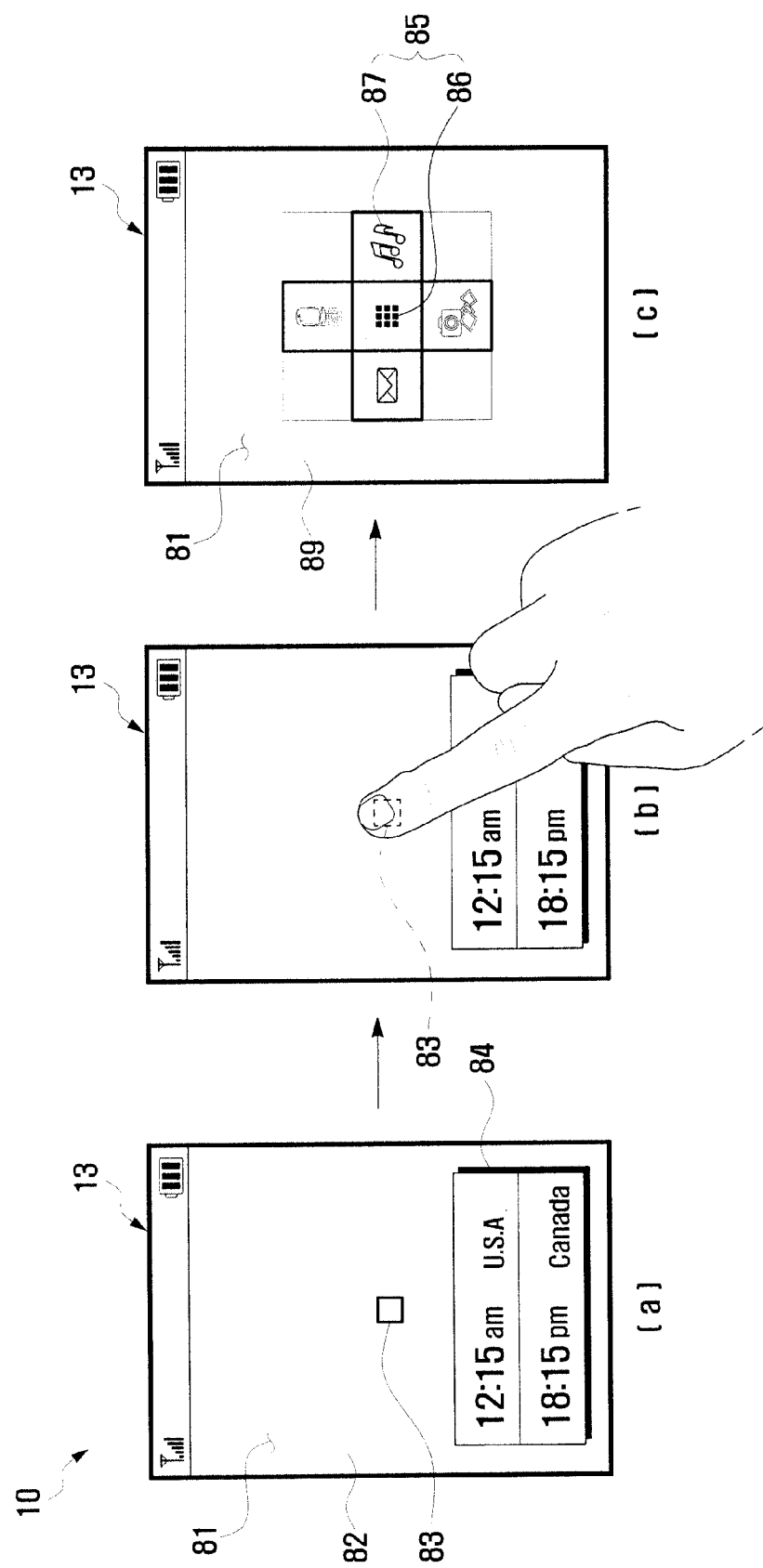

ONSCREEN FUNCTION EXECUTION METHOD FOR MOBILE TERMINAL HAVING A TOUCHSCREEN

CROSS-REFERENCE TO RELATED APPLICATION(S)

This application is a continuation application of prior application Ser. No. 14/613,627, filed on Feb. 4, 2015, which was a continuation application of prior application Ser. No. 12/014,056, filed on Jan. 14, 2008, which issued as U.S. Pat. No. 9,041,681 on May 26, 2015 and claimed the benefit under 35 U.S.C. §119(a) of a Korean patent application filed in the Korean Intellectual Property Office on Feb. 8, 2007 and assigned Serial number 2007-0013448, the entire disclosure of which is hereby incorporated by reference.

BACKGROUND OF THE INVENTION

1. Field of the Invention

The present invention relates to an onscreen function execution method for a mobile terminal. More particularly, the present invention relates to a method for executing functions of an activated application by tapping on a specific area of a touchscreen of a mobile terminal.

2. Description of the Related Art

With the advance of computing and wireless technologies, mobile terminals can now provide personalized features with various embedded application programs as well as basic voice communication. These mobile application programs include a personal scheduler, a short message service (SMS), a built-in camera application, a multimedia player, a documenter reader, games, etc., such that a user can manipulate various types of user data such as pictures taken by the camera, downloaded still and motion pictures, text messages, electronic books, ring tones, sound files (e.g., MP3), game contents and the like. Furthermore, the mobile terminal can be a mobile phone, a Personal Digital Assistant (PDA), a Portable Multimedia Player (PMP), etc. enabled by a wireless communication function.

Recently, touchscreens are being widely used as input devices for mobile terminals. A touchscreen allows a user to activate applications and execute functions by touching icons or elements displayed on the screen. The touchscreen is simple to use and improves user convenience in comparison with a conventional keypad.

However, the conventional touchscreen is limited in its effectiveness since it requires a user to become familiar with the manipulation of onscreen icons and menu bars and sometimes requires a series of complicated touch events for executing a specific function.

SUMMARY OF THE INVENTION

An aspect of the present invention is to address the above-mentioned problems and/or disadvantages and to provide at least the advantages described below. Accordingly, an aspect of the present invention is to provide an onscreen function execution method for a mobile terminal that is capable of intuitively executing functions of an activated application by a tap on the touchscreen.

In accordance with an aspect of the present invention, an onscreen function execution method for a mobile terminal having a touchscreen is provided. The onscreen function execution method of the present invention includes mapping an active region of the touchscreen to a function of an application, displaying an application screen in response to an application activation command and executing, if a tap is detected on the active region, a function mapped to the active region.

In accordance with a further aspect of the present invention, a mobile terminal having a touchscreen is provided. The mobile terminal includes a control unit for mapping an active region of the touchscreen to a function of at least one application and for executing, if a tap is detected on the active region, the function mapped to the active region and a display unit for displaying an application screen in response to an application activation command.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIG. 5 is a diagram illustrating steps of an onscreen function execution method according to another exemplary embodiment of the present invention.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Mobile Terminal Having Touchscreen

Figure 1:
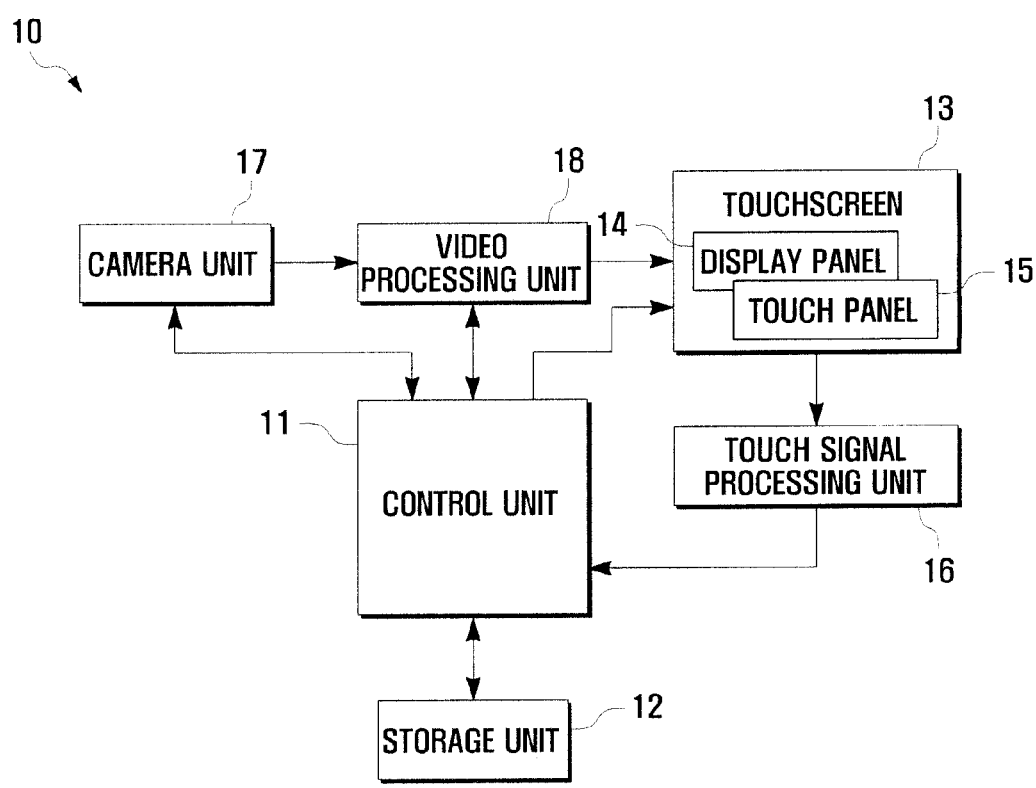
FIG. 1 is a block diagram illustrating a configuration of a touchscreen-enabled mobile terminal having an onscreen function execution method according to an exemplary embodiment of the present invention.

FIG. 1 is a block diagram illustrating a configuration of a touchscreen-enabled mobile terminal 10 having an onscreen function execution method according to an exemplary embodiment of the present invention.

Referring to FIG. 1, the mobile terminal 10 includes a control unit 11, a storage unit 12, a touchscreen 13, a touch signal processing unit 16, a camera unit 17, and a video processing unit 18.

The control unit 11 controls general operations of the mobile terminal. For example, the control unit 11 controls the executing of functions by an activated application program in response to input made by tapping on a specific area of the touchscreen.

The storage unit 12 stores application programs for the mobile terminal and data generated while an application program runs under an operating system. For example, the storage unit 12 stores the application program associated with function execution and data generated while the application program operates.

The touchscreen 13 is provided with a display panel 14 and a touch panel 15 installed on the display panel 14. The touchscreen 13 displays operation status information and data stored in the storage unit 12 in the form of various application screens and generates signals in response to a tap detected on the touch panel 15. In an exemplary embodiment, the touchscreen 13 is configured to change the application screen in response to a tap. However, other changes may also occur in response to a tap. For example, an application may be controlled by the tap without a change in the screen appearance.

The touch signal processing unit 16 analyzes the signal generated by the touchscreen and outputs position data corresponding to the signal to the control unit 11. That is, the touch signal processing unit 16 determines whether a tap is detected on a specific area of the touchscreen and outputs the position data corresponding to the tap to the control unit 11. In an exemplary implementation, the signal is an electric analog signal. However, other signals, such as a digital electric signal, are also within the scope of the invention.

The camera unit 17 takes a picture and outputs the picture as image data. That is, the camera unit 17 captures still or moving images according to its operation mode selected by a user. The mode selection may be made by a touch on the touchscreen. The camera unit 17 includes an image sensor for converting an object image into an electric analog signal and a signal processor for converting the analog signal into a digital signal.

The video processing unit 18 processes the video signal output by the camera unit 17 to be displayed on the touchscreen 13.

The touch panel 15 is provided with active regions mapped to functions of the application program. If a tap is detected at an active region on the touch panel 15, the control unit 11 performs a function mapped to the active region on which the tap is detected.

The application programs may include an image recoding program associated with the camera unit 17, a music player program, an idle mode screen program and the like that are activated in respective operation modes, i.e. camera mode, music player mode, idle mode and the like. As an example, if the mobile terminal enters a music player mode, the control unit 11 activates the music player program such that music files, for example MP3 files, can be played. As another example, in the idle mode, the control unit 11 activates the idle mode screen program such that an idle mode screen is displayed on the touchscreen 13. The idle mode screen program may include application icons representing application programs, menu bars for executing functions of the application programs, function icons and the like.

The idle mode screen can be configured with frequently executed functions of specific application programs. For example, at least one of a preview function, a focusing function, a shutter release function, a save function and the like can be selected as frequently executed functions in the camera mode. In the idle mode, the specific functions can be presented in the form of application icons on the idle mode screen.

An active region is a region for presenting an execution status of a function of an activated application program, that is, a function execution display region. For example, the active region can be a frame showing a viewfinder image and a captured image in the camera mode. In the music player mode, the active region may be used to show an image associated with a music file. In the idle mode, the active region may be used to show an idle mode screen image.

Tap-Based Function Execution

Figure 2:
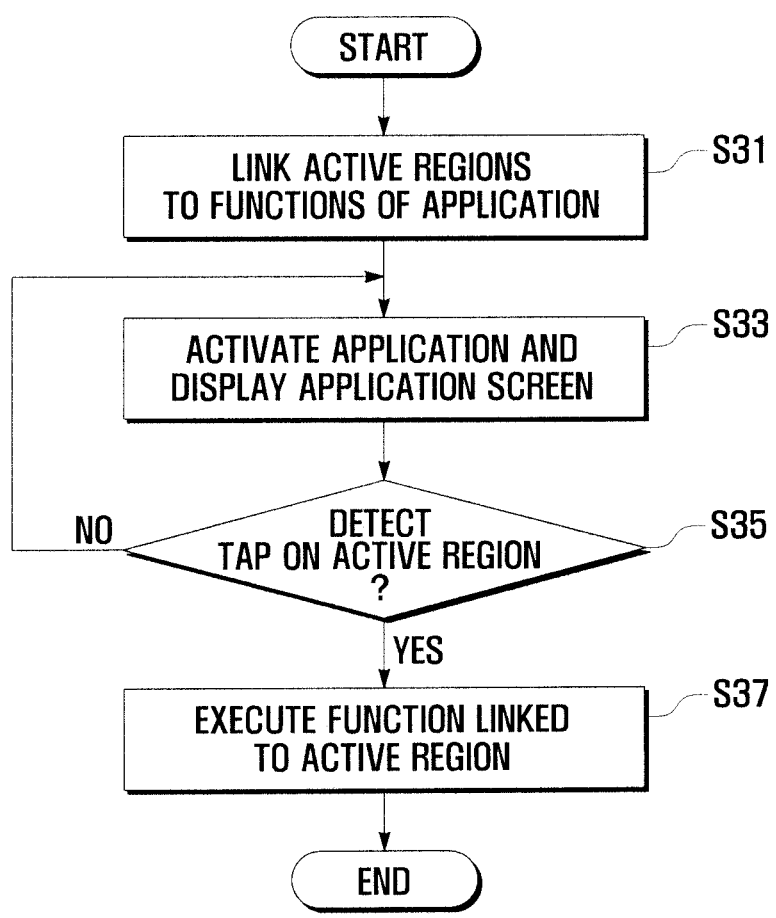
FIG. 2 is a flowchart illustrating an onscreen function execution method according to an exemplary embodiment of the present invention.

FIG. 2 is a flowchart illustrating an onscreen function execution method according to an exemplary embodiment of the present invention.

Referring to FIGS. 1 and 2, the control unit 11 links the active regions of the touchscreen 13 to specific functions of the applications in step S31. The linkage between the functions and active regions are configured at the manufacturing phase of the mobile terminal or can be configured by a user afterward.

If a selection command is generated by touching the touchscreen 13, the control unit 11 controls such that an application program is activated and an application screen is displayed on the touch screen in step S33. In an exemplary implementation, the selection command may be generated by touching an application icon on the touch screen wherein the application program is represented by the application icon.

After the application program is activated, the control unit determines whether a tap event occurs on an active region of the touch screen 13 in step S35. If no tap event is detected, the control unit 11 maintains the displaying of the application screen in step S33.

If a tap event is detected on an active region, the control unit 11 executes a function linked to the active region in step S37. At this time, a function execution screen can be displayed on the touchscreen 13 under the control of the control unit 11.

First Exemplary Embodiment

Figure 3:
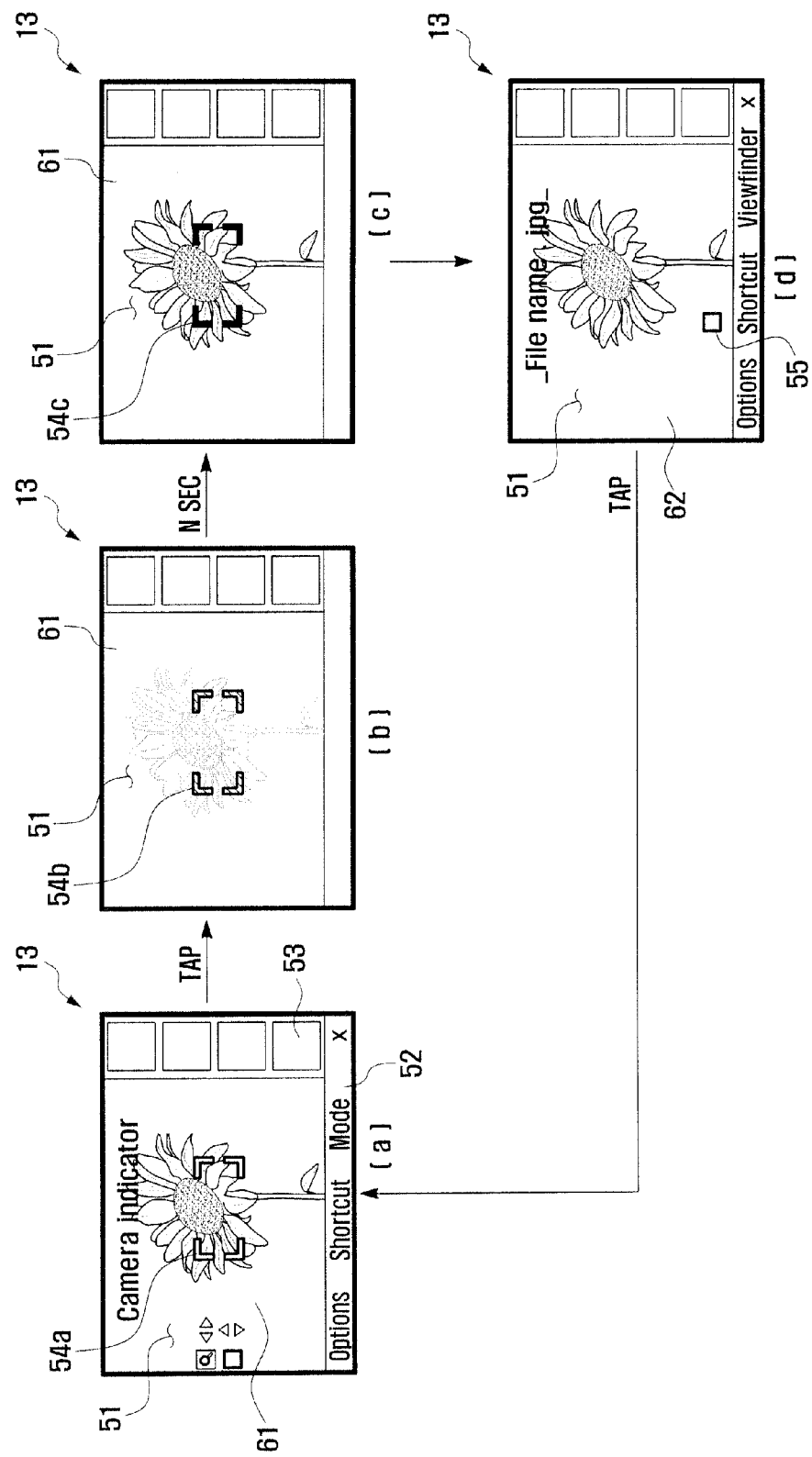
FIG. 3 is a diagram illustrating steps of an onscreen function execution method according to an exemplary embodiment of the present invention.

FIG. 3 is a diagram illustrating steps of an onscreen function execution method according to an exemplary embodiment of the present invention. In this embodiment, the mobile terminal operates in a camera mode.

If a camera application is activated, for example by touching a camera application icon on the touchscreen 13, the control unit 11 enables the camera unit 17. The control unit also displays a viewfinder image 61 of the camera unit 17 on a viewfinder region 51 of the touchscreen 13 as shown in a screen image (a) of FIG. 3. The viewfinder region 51 is provided with a focusing bracket 54a. At this time, the touchscreen 13 presents function icons 53 and a menu bar 52 associated with the camera application program. In an exemplary embodiment as illustrated, the function icons 53 are arranged at the right side of the touchscreen 13 and the menu bar 52 is arranged at the bottom of the screen 13. Of course, it is noted that the function icons 53 as well as the menu bar 52 may be arranged at any of the sides of the screen or located elsewhere on the screen. Alternatively, the function icons 53 and menu bar 52 may be displayed on another screen.

If a tap is detected at the viewfinder region 51, the control unit 11 locks the image 61 for a predetermined time (N seconds, where N is a real number) as shown in screen images (b) and (c) of FIG. 3. Finally, the control unit 11 records the viewfinder image 61 as a captured image 62 as shown in screen image (d) of FIG. 3. At this time, the captured image 62 is displayed in the viewfinder region 51 and function icons 55 associated with processing the captured image 62 are presented at the left side of the touchscreen 13 (for example, an image transmission function icon, an image enlargement function icon and the like).

If a tap is detected on the captured image 62, the control unit 11 controls such that the viewfinder image 61 is shown in the viewfinder region 61 as shown in the screen image (a) of FIG. 3.

In order for a user to recognize the function execution status in the camera mode, the focusing bracket can be presented in a different manner as illustrated by 54a, 54b, and 54c in images (a), (b) and (c) respectively. In an exemplary embodiment, the function execution status of the camera mode is indicated by markings of the focusing bracket 54a, 54b, and 54c as shown in the screen images (a), (b), and (c) of FIG. 3. When the captured image is displayed, no focusing bracket appears as shown in screen image (d) of FIG. 3.

In this manner, the series of steps from focusing to recording an image can be performed using a series of tapping actions on the touchscreen. That is, the frequently used functions including focusing, capturing, and storing an image can be intuitively performed by simply using tapping actions.

Although a series of commands are individually executed by each tap in this exemplary embodiment, the present invention is not limited thereto. For example, the onscreen function execution method can be implemented such that a series of commands are executed by a single tap. In this case, the commands are executed in a sequential order and the focusing function can be omitted.

Second Exemplary Embodiment

Figure 4:
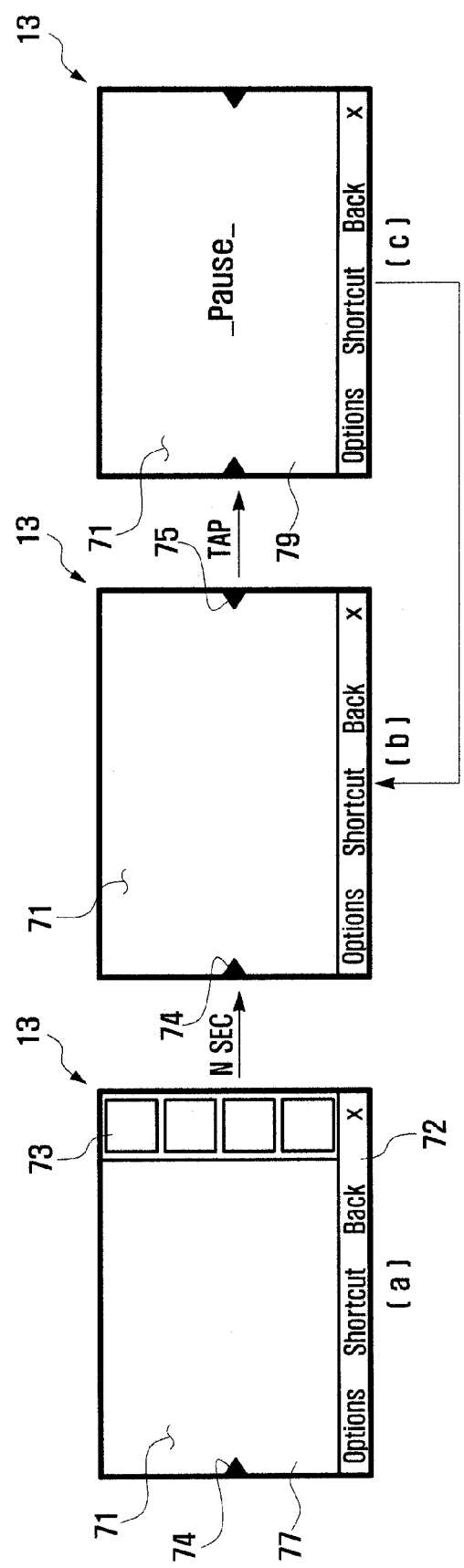
FIG. 4 is a diagram illustrating steps of an onscreen function execution method according to another exemplary embodiment of the present invention.

FIG. 4 is a diagram illustrating steps of an onscreen function execution method according to another exemplary embodiment of the present invention. In this exemplary embodiment, the mobile terminal operates in a music player mode.

If a music player application is activated, for example by touching a music player application icon, the control unit 11 plays a music file and presents an image 77 associated with the music file in a main image region 71 as shown in screen images (a) and (b) of FIG. 4. At this time, the touchscreen 13 presents function icons 73 and a menu bar 72 associated with the music player program. In this exemplary embodiment, the function icons 73 are arranged at the right side of the touchscreen 13 and the menu bar 72 is arranged at the bottom of the touchscreen 13. It is again noted that the function icons 73 as well as the menu bar 72 may be arranged at any of the sides of the screen or located elsewhere on the screen. Alternatively, the function icons 73 and menu bar 72 may be displayed on another screen.

As illustrated in image (b) of FIG. 4, if a predetermined time (N seconds, where N is a real number) is elapsed, the function icons 73 disappear and an arrow tip 75 for recalling the function icons 73 appears on the right side of the screen. Another arrow tip 74 may appear at a left side of the touchscreen 13 and is provided for calling available music files or a music album and indicates that a music file is playing. Of course, although arrow tips are illustrated, this is merely exemplary, as is the location of the arrow tips.

If a tap is detected at the main image region 71, the control unit 11 pauses playing the music file and shows a text "Pause" in the main image region 71 as shown in a screen image (c) of FIG. 4.

If a tap is detected while the music is paused, the control unit 11 plays the music file again as shown in the screen image (a) or (b).

In this manner, the user can stop or play the music file by tapping on the touchscreen 13 in the music player mode. That is, starting and stopping playback of a music file can be intuitively controlled by tapping the touchscreen. It should be noted that while the above exemplary embodiment has described a feature wherein a music file is paused or played depending on a tap on the touchscreen, this is only an example of the present invention. A tap on the touchscreen may be used to control other or additional functions in the music player mode. For example, a tap may be used to forward or rewind through a playing music file, to skip to the next or previous file, to skip to the next or previous album, or other features as a user may desire to incorporate.

Third Exemplary Embodiment

FIG. 5 is a diagram illustrating steps of an onscreen function execution method according to another exemplary embodiment of the present invention. In this exemplary embodiment, the mobile terminal operates in the idle mode.

While the mobile terminal operates in the idle mode, the control unit 11 displays an idle mode screen 82 having a growing point or display starting point 83 in a display region 81 as shown in a screen image (a) of FIG. 5. The starting point 83 is located at a center of the idle mode screen 82. At the bottom of the touchscreen 13, a clock 84, a calendar, a music player icon and the like may be arranged. Although not shown in FIG. 5, the calendar and music player icon as well as the clock 84 can be presented in a sequential order.

If a tap is detected at the starting point 83 on the touchscreen 13, the control unit 11 controls such that application icons 85 appear on the display region 81 as shown in a screen image (c) of FIG. 5. In an exemplary implementation, the applications represented by the application icons 85 are frequently used applications. The application icons may include a primary application icon 86 positioned at the center of the touchscreen 13 and secondary application icons 87 arranged around the primary application icon 86. In the illustrated example of screen image (c), the primary application icon 86 is a main menu icon and the secondary application icons 87 include a camera application icon, music player icon, message service icon, and voice communication icon.

Of course, different icons and a different number of icons may be displayed in various arrangements beyond the arrangement illustrated in image (c) of FIG. 5. For example, in the illustrated exemplary embodiment, each application icon has a rectangular shape and the secondary application icons 87 are arranged along the four side of the primary application icon 86. However, the application icons can be modified in shape and arranged in different formation. For example, the application icons can be provided in the form of grid, rings, eclipses, circles, or polygons. Moreover, the number and types of icons, including the functions they represent, may be chosen and set by the user.

Although not shown in FIG. 5, if a touch is detected on an application icon, the control unit 11 activates an application program represented by the application icon.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

As described above, the onscreen function execution method of the present invention allows for intuitively executing functions of application programs by tapping icons representing the functions on a touchscreen, resulting in improvement of user convenience.

What is claimed is:

1. An apparatus comprising:
   a camera;
   a touch screen; and
   a processor adapted to:
      display a graphical object via the touch screen,
      display one or more menus via the touch screen in response to a first touch input with respect to the graphical object, each of the one or more menus corresponding to a specified function,
      select, in response to a second touch input, a specified function related to the camera from one or more specified functions corresponding to the one or more menus,
      display an image via the touch screen with respect to the specified function related to the camera,
      receive a third touch input via the touch screen with respect to the image, and
      perform focusing with respect to the image in response to the third touch input.

2. The apparatus of claim 1, wherein the processor is further adapted to:
   display the graphical object as part of a first screen, and
   display the one or more menus as overlying the first screen.

3. The apparatus of claim 1, wherein the processor is further adapted to:
   display an indicator indicating the focusing as overlying the image.

4. The apparatus of claim 1, wherein the processor is further adapted to:
   display, as at least part of a menu of the one or more menus, an icon indicative of the specified function corresponding to the menu.

5. The apparatus of claim 1, wherein the processor is further adapted to:
   capture the image after previewing the image via the touch screen for a specified period of time.

6. The apparatus of claim 5, wherein the processor is further adapted to:
   display the image with the focusing performed.

7. The apparatus of claim 1, wherein the graphical object comprises a camera application icon.

8. A portable communication device comprising:
   a camera;
   a touch screen; and
   a processor adapted to:
      display a graphical object corresponding to one or more applications via the touch screen,
      display a first icon and a second icon via the touch screen in response to a first input with respect to the graphical object, the first icon indicative of a first specified function related to the one or more applications and the second icon indicative of a second specified function related to the one or more applications, and
      perform a corresponding specified function of the first and second specified functions in response to a second input with respect to a corresponding icon of the first and second icons.

9. The portable communication device of claim 8, wherein the first specified function comprises a function related to a first one of a camera application, a message application, a multimedia player application, or a call application, and the second specified function comprises a function related to a second one of the camera application, the message application, the multimedia player application, or the call application.

10. The portable communication device of claim 8, wherein the first specified function and the second specified function are related to a same application of the one or more applications.

11. The portable communication device of claim 8, wherein the corresponding specified function comprises a function related to a camera application, and
   wherein the processor is further adapted to display an image via the touch screen as at least part of the performing, the image corresponding to an object external to the portable communication device and obtained using the camera.

12. The portable communication device of claim 11, wherein the processor is further adapted to:
   perform focusing with respect to the image in response to a third touch input with respect to the image displayed via the touch screen.

13. The portable communication device of claim 12, wherein the processor is further adapted to:
   capture the image with the focusing performed.

14. The portable communication device of claim 13, wherein the processor is further adapted to:
   display an icon as overlying the image via the touch screen in response to the capturing, the icon to be used to receive a request for transmission of the image to an electronic device external to the portable communication device.

15. The portable communication device of claim 14, further comprising a communication interface,
   wherein the processor is further adapted to transmit, using the communication interface, the image captured with the focusing performed to the electronic device in response to a second touch input with respect to the icon.

16. An apparatus comprising:
a camera;
a touch screen; and
a processor adapted to:
- display, via the touch screen, an image corresponding to an object external to the apparatus and obtained from the camera,
- receive a touch input with respect to the image displayed via the touch screen,
- perform focusing with respect to the image in response to the touch input,
- capture the image with the focusing performed, and
- display an icon as overlying the image via the touch screen in response to the capturing, the icon to be used to receive a request for transmission of the image to an electronic device external to the apparatus.

17. The apparatus of claim 16, further comprising a communication interface,
wherein the processor is further adapted to transmit, using the communication interface, the image captured with the focusing performed to the electronic device in response to a second touch input with respect to the icon.

18. The apparatus of claim 16, wherein the processor is further adapted to:
display the graphical object as part of a first screen, and display the one or more menus as overlying the first screen.

19. The apparatus of claim 16, wherein the processor is further adapted to:
remove the icon from the touch screen based at least in part on a determination that a specified condition is satisfied.

20. The apparatus of claim 16, wherein the processor is further adapted to:
display an indicator indicating the focusing as overlying the image.

* * * * *